Aug. 23, 1932.  L. C. SHIPPY ET AL  1,873,157
AUTOMATIC LATHE
Filed March 10, 1930  9 Sheets-Sheet 2

Aug. 23, 1932.  L. C. SHIPPY ET AL  1,873,157
AUTOMATIC LATHE
Filed March 10, 1930  9 Sheets-Sheet 3

Aug. 23, 1932.    L. C. SHIPPY ET AL    1,873,157
AUTOMATIC LATHE
Filed March 10, 1930    9 Sheets-Sheet 9

Patented Aug. 23, 1932

1,873,157

UNITED STATES PATENT OFFICE

LEO C. SHIPPY AND ALVA W. PHELPS, OF ANDERSON, INDIANA, ASSIGNORS TO DELCO-REMY CORPORATION, OF ANDERSON, INDIANA, A CORPORATION OF DELAWARE

AUTOMATIC LATHE

Application filed March 10, 1930. Serial No. 434,612.

This invention relates to automatic lathes and particularly to lathes for machining the ends of tubular pieces such as are used to form the field frames of dynamo electric machines.

It is an object of the present invention to provide an automatic lathe of rugged and durable construction by means of which tubular work pieces may be rapidly machined.

Further objects and advantages of the present invention will be apparent from the following description, reference being had to the accompanying drawings, wherein a preferred embodiment of one form of the present invention is clearly shown.

Figure 1:
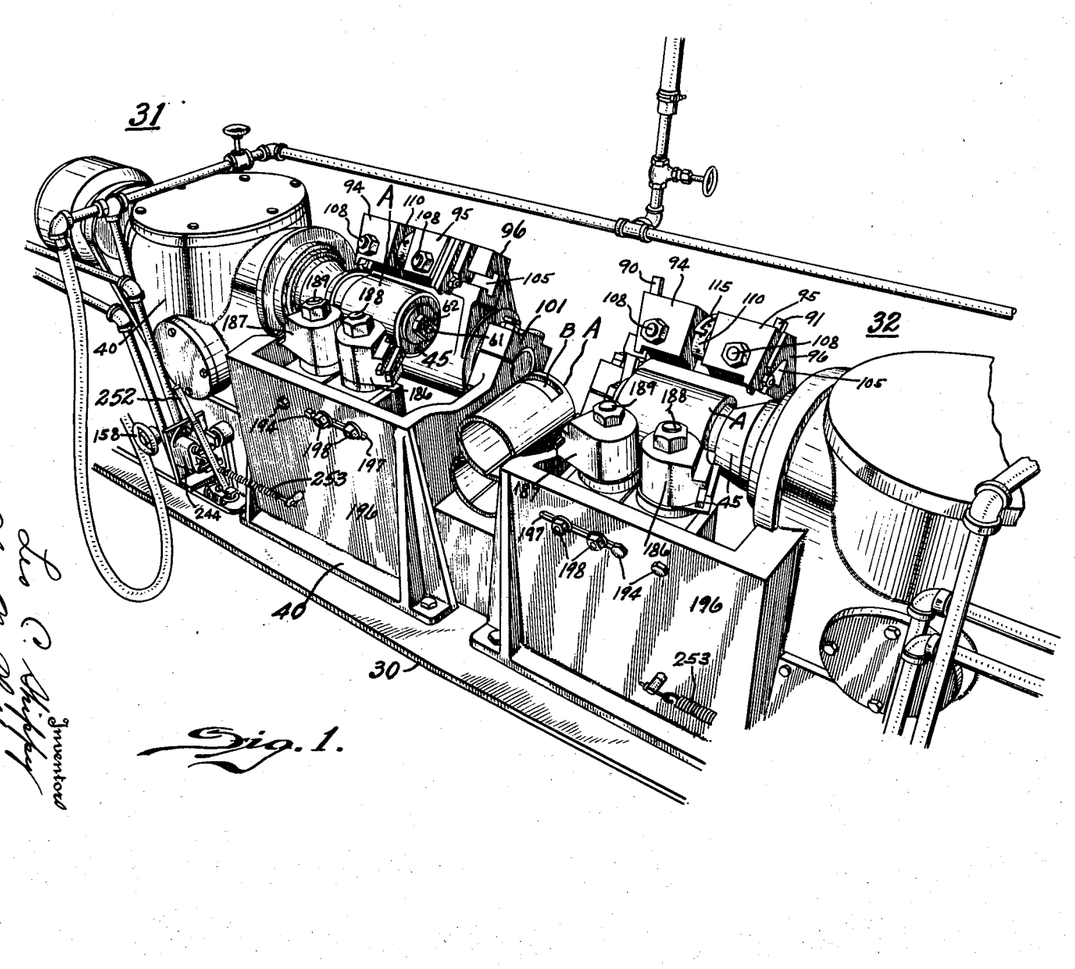
Fig. 1 is a fragmentary perspective view of a machine embodying the present invention.
Figure 2:
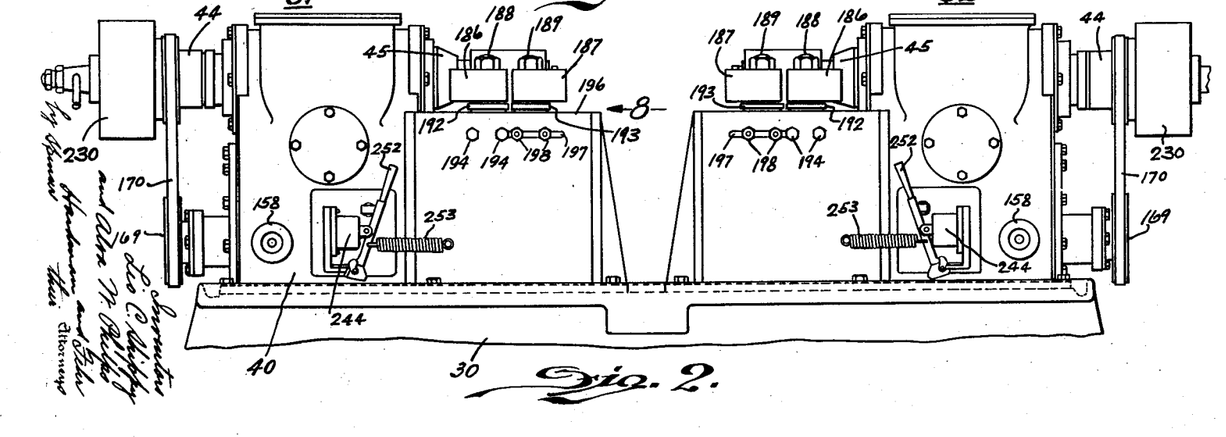
Fig. 2 is a side elevation.
Figure 3:
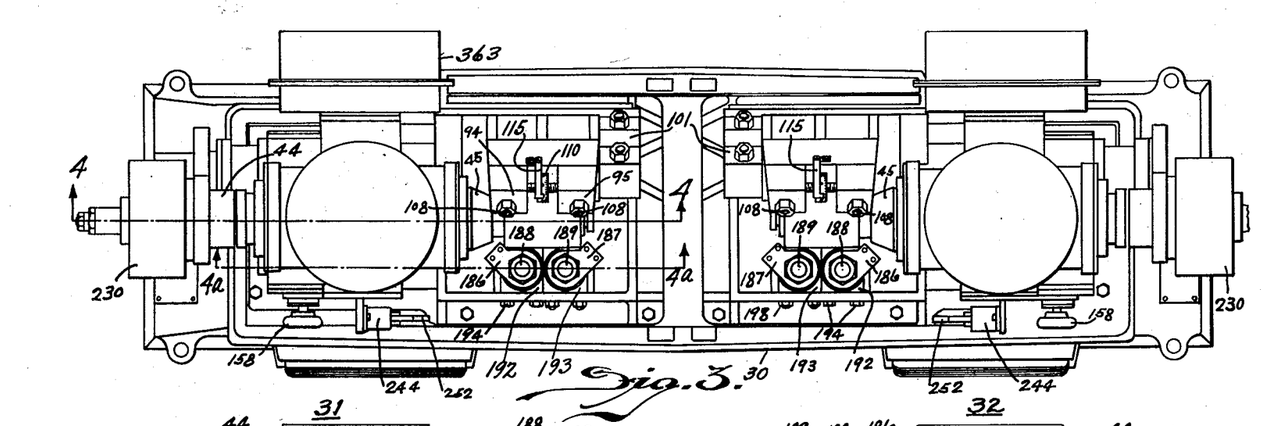
Fig. 3 is a plan view.

Referring to Figs. 1, 2 and 3 it will be seen that a base 30 supports duplicate lathes 31 and 32 which are similar in all respects except that one is the right hand and the other the left. This arrangement provides for the manipulation of two lathes by one operator, one lathe operating to machine a work piece while the operator unloads and reloads the other machine. Since both machines are alike only the left hand machine 31 will be described.

Figure 4:
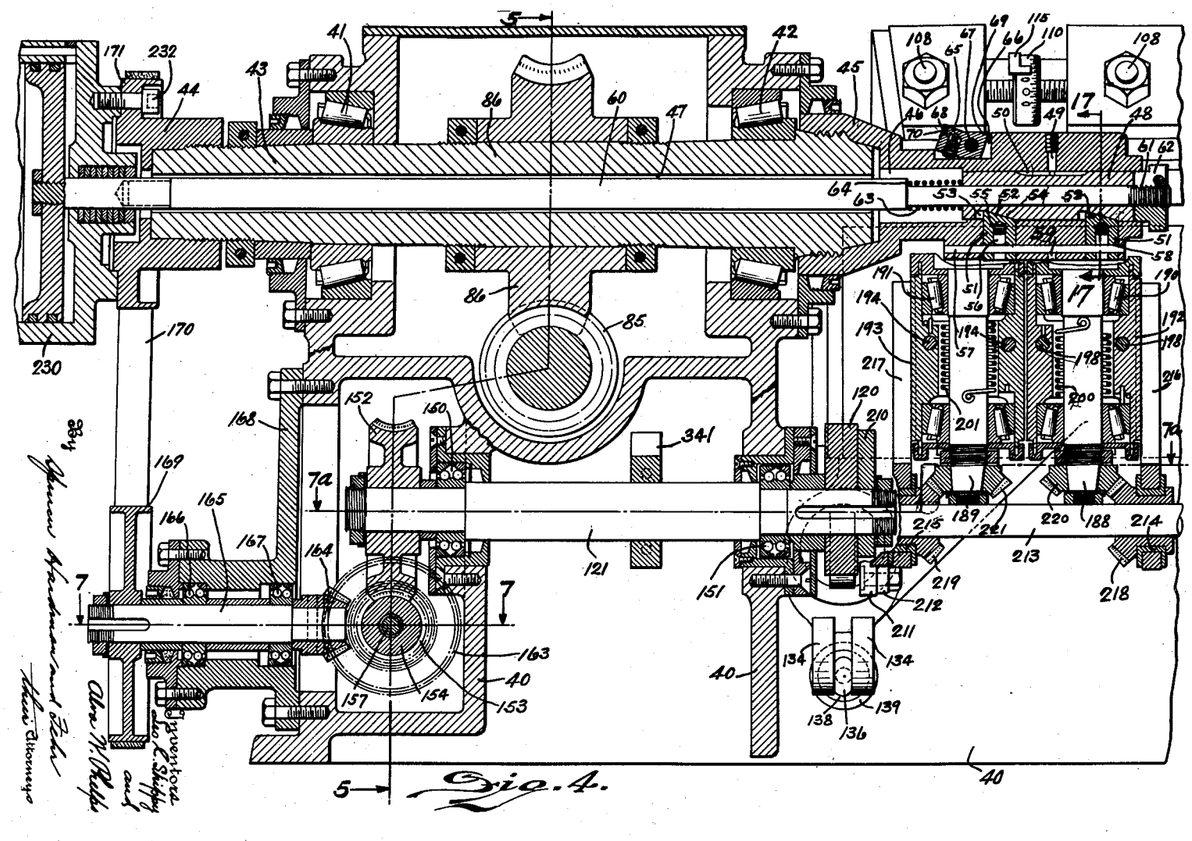
Fig. 4 is a fragmentary sectional view, taken partly on the line 4—4 of Fig. 3 and partly on the line 4a—4a of Fig. 3.

The lathe 31 comprises a main frame 40 which as shown more particularly in Fig. 4 provides bearings 41 and 42 for a spindle or hollow shaft 43 attached at one end to a pulley 44 and at the other to a chuck frame 45. (See also Fig. 24.) The frame 45 has a central bore 46 in alignment with the hole 47 through the shaft 43. The bore 46 receives a chuck operating cam 48 which slides along the bore 46 but is prevented from turning by a screw pin 49 threaded through the frame 45 and having its inner end located in a longitudinal groove 50 in the cam 48. The frame 45 supports a plurality of pairs of radially movable chuck jaws 51 each having a beveled inner end 52 received by a notch 53 in the cam 48.

Figures 22, 23, 24:
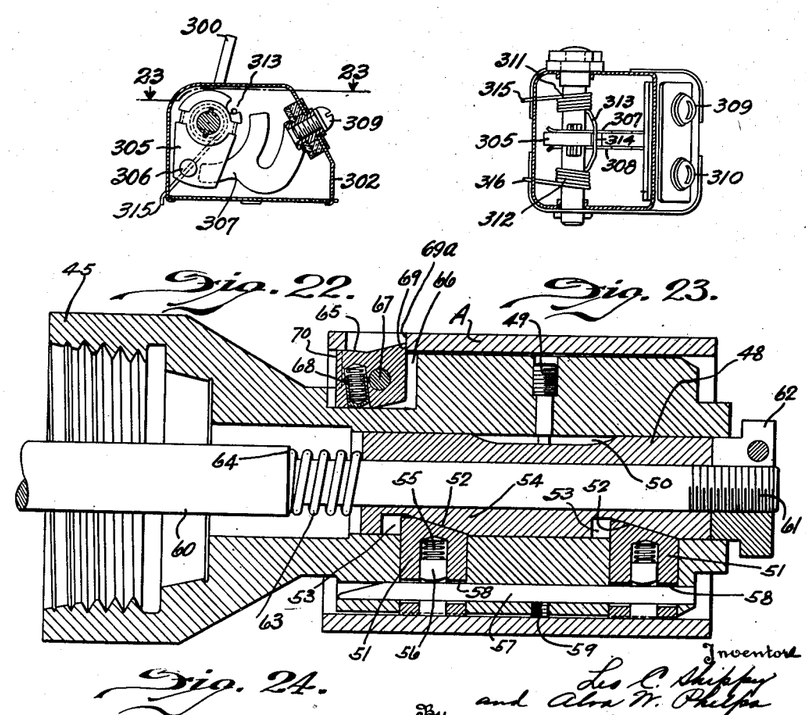
Fig. 22 is an enlarged scale cross sectional view of the control switch, this view being taken on the line 22—22 of Fig. 18.
Fig. 23 is a sectional view on the line 23—23 of Fig. 22.
Fig. 24 is a longitudinal sectional view of the chuck detached from the spindle showing the chuck jaws advanced to grip the work.

Each notch 53 is defined by an oblique surface 54 cooperating with the jaw surface 52. Each jaw 51 is urged toward the center of the cam 48 by a spring 55 bearing at its outer end against a button 56 which, in turn, presses against a rod 57 extending longitudinally through the frame 45 and through elongated holes or slots 58 in each of the jaws 51. The rod 57 is secured in position by a set screw 59. When the cam 48 is moved toward the left, the jaws 51 will be moved radially outwardly, and when the cam 48 is moved toward the right, the jaws will be moved inwardly by the springs 55. The cam 48 is moved toward the left by a rod 60 which is actuated in a manner to be described later. The rod 60 has a threaded end 61 receiving clamp nut 62 bearing against the right hand end of the cam 48 which is maintained in engagement with the nut by a spring 63 located between the left hand end of the cam 48 and the shoulder 64 provided by the rod 60.

When the jaws 51 are retracted, a work piece such as a dynamo field frame A may be placed upon the frame 45 as shown in Figs. 1 and 24. The frame A is located longitudinally with respect to the chuck frame 45 by providing the latter with a pivoted latch 65 received by a notch 66 and so shaped as to provide for a limited amount of rotation about a pin 67. A spring pressed plunger 68 urges the latch 65 in a clockwise direction as viewed in Fig. 4. Normally the right hand end point 69 of the latch 65 is substantially flush with the work receiving periphery of the chuck frame 45 while the left hand end point 70 is above said periphery. When a frame A is moved toward the left as viewed in Fig. 4 or toward the right as viewed in Fig. 13 along the chuck frame 45 into the position shown in Fig. 24, the latch 65 will move counterclockwise as viewed in Figs. 4 and 24 about its pivot 67 due to the fact that the frame A engages the latch point 70 as the frame A moves in the direction described. Consequently, the latch 65 is moved so as to cause its point 69 to engage an edge 69a of the window B to prevent further movement of the frame A in the manner described. However, the latch 65 permits removal of the frame A by movement thereof toward the right as viewed in Fig. 24.

The chuck spindle 43 is driven by a suitable electric motor (not shown) having a multiple belt drive 80 (see Fig. 5) with a pulley 81 keyed to a shaft 82 mounted in bearings 83 and 84 carried by the frame 40. The shaft 82 provides a worm 85 meshing with a worm gear 86 attached to the shaft or chuck spindle 43.

Figure 7:
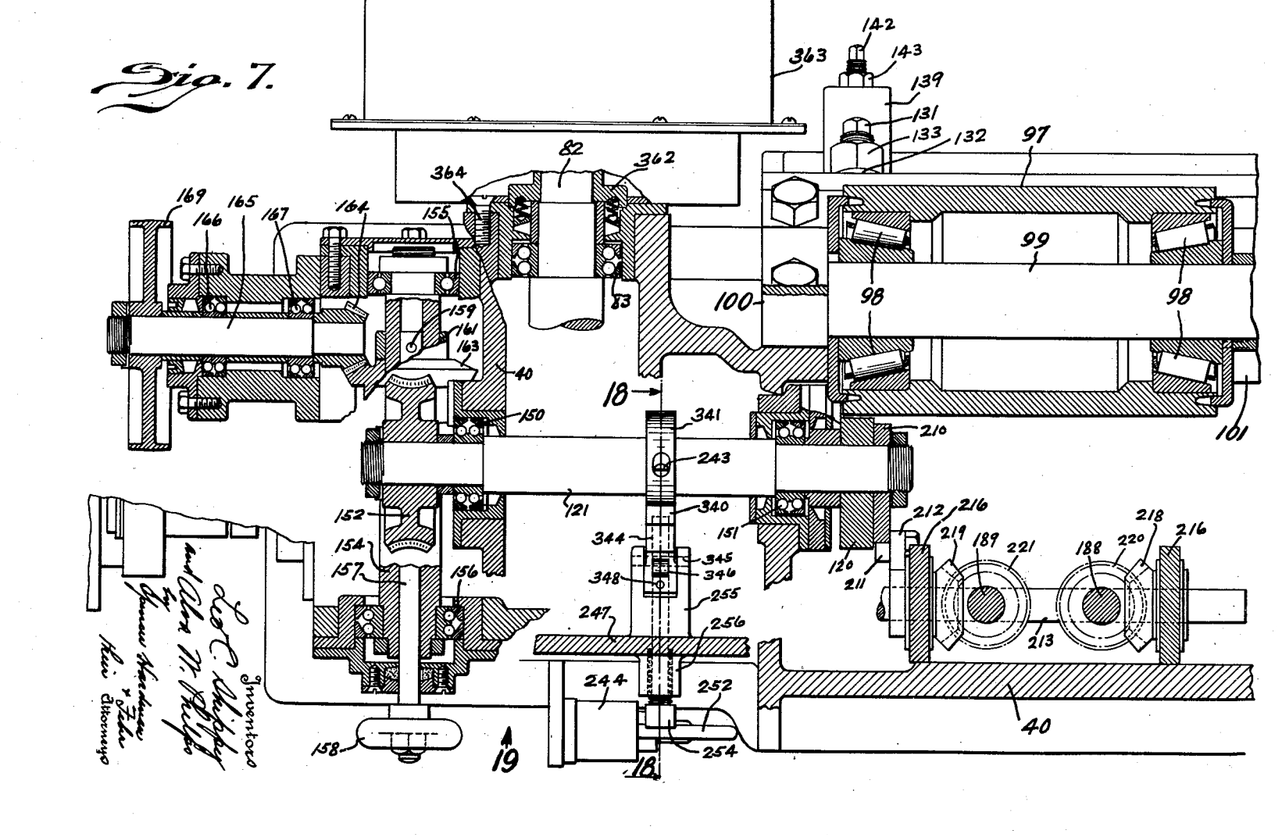
Fig. 7 is a fragmentary sectional view taken on the line 7—7 and 7a—7a of Fig. 4.

While the work piece A is rotating with the spindle 43, its ends are faced off at right angles to its axis of rotation by tools 90 and 91 located so as to operate respectively upon the left and right hand ends of the piece A. The tools 90 and 91 are adjustably secured by clamp bars 92 and 93 respectively to tool supports 94 and 95 respectively. Each of the clamp bars 92 and 93 receive a stud 96 threaded into a tool support and receiving a nut 97 which, when tightened, secures the clamp bar in position to clamp the tool against its tool support. The tool supports 94 and 95 are carried by a rocking frame 96 having a hollow cylindrical hub 97 which carries bearings 98, the inner races of which are supported by a stationary shaft 99, the ends of which are secured to clamp brackets 100 and 101 as shown in Figs. 7 and 1. The upper end of the frame 96 is provided with a T-slot or groove 105, and each of the tool supports 94, 95 has an extension 106 received by the groove 105. Thus the tool supports are guided for movement along the surface 107 of the frame 96 and longitudinally with respect to the axis of the work A. Each of the tool supports 94, 95 is secured in a desired position against the surface 107 by a bolt 108, the head 108a of which is received by the enlarged portion of the T-slot 105, and by a nut 109 which cooperates with the bolt to clamp the tool support in position. A micrometer adjustment is provided for adjustably spacing the tool supports 94, 95 and this micrometer includes a graduated head 110 mounted on a shaft having right hand screw threads 111 and left hand screw threads 112 threadedly engaging holes 113 and 114 in the blocks 94 and 95 respectively. The head 110 cooperates with an index 115 attached by screws 116 to the frame 96.

Frame 96 is caused to oscillate by means now to be described in order that the tools 90 and 91 will be moved in a direction at right angles to the axis of rotation of the work A in order that the end faces of the work will be machined at right angles to the axis thereof. The swinging frame oscillating mechanism comprises a cam 120 attached to a shaft 121 and cooperating with a roller 122 journalled on a ball bearing 123 mounted on a rod 124 extending across a recess 125 provided in a cylindrical block 126 mounted to slide within a recess 127 provided in a tubular or cup-shaped member 128 integral with the lower arm 129 of the swinging frame 96. The block has a swivel connection at 130 with an adjusting screw 131 which is threaded through a boss 132 integral with the arm 129 and which is secured in the desired position of adjustment by a lock nut 133. At its lower extremity the arm 129 provides a pair of spaced ears 134 across which extend a pin 135 supporting a link 136 which is pivotally attached at 137 to a piston 138 slidable through a cylinder 139 attached to the side of the frame 40. A spring 140 located between the shouldered head 141 of a screw 142 and the end wall of the piston 138 urges the roller 122 against the cam 120.

The compression of the spring 140 is varied by turning the screw 142 which may be secured in the desired position of adjustment by tightening a lock nut 143.

Figure 5:
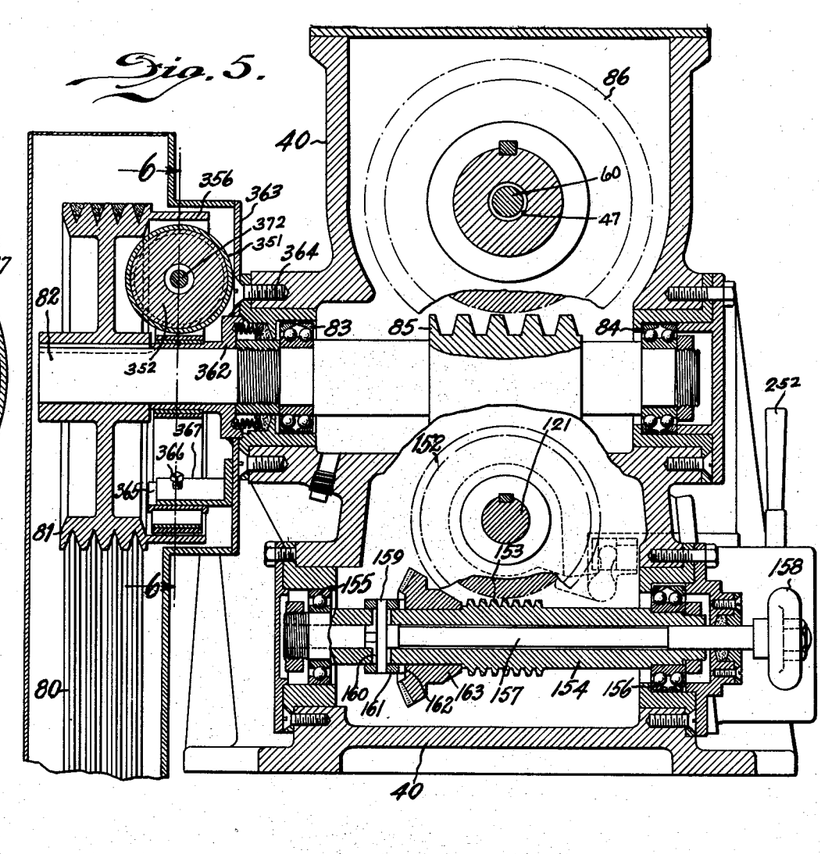
Fig. 5 is a sectional view on the line 5—5 of Fig. 4.
Figure 8:
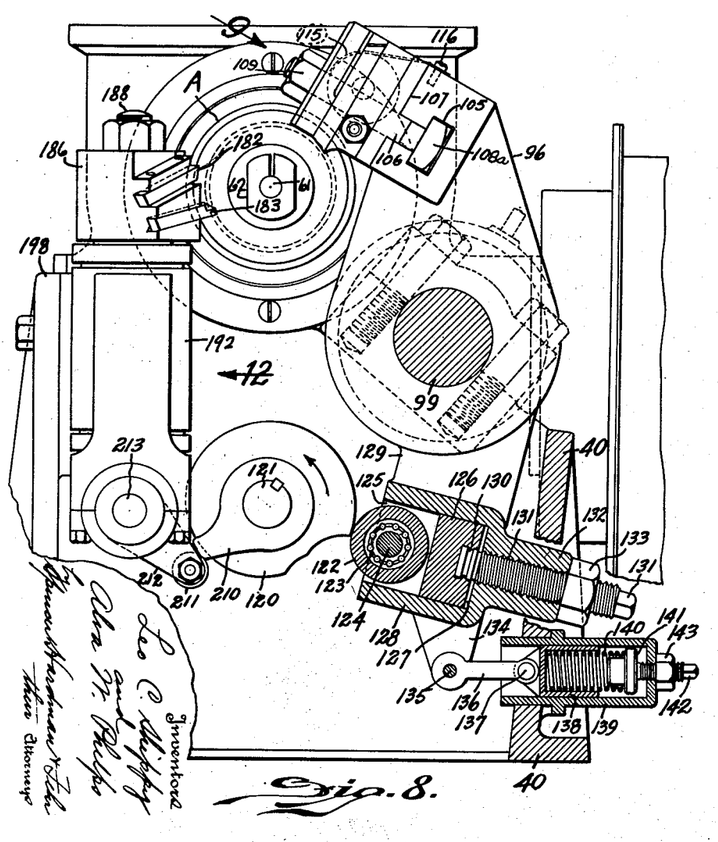
Fig. 8 is a view looking in the direction of the arrow 8 in Fig. 2 but drawn to a larger scale than Fig. 2, certain parts being shown in section for sake of clearness.
Figure 9:
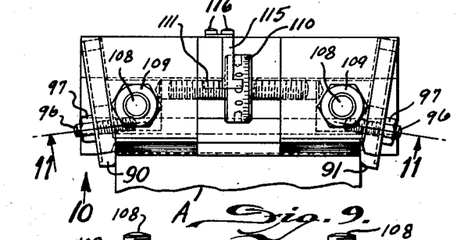
Fig. 9 is a fragmentary view looking in the direction of the arrow 9 in Fig. 8.
Figure 10:
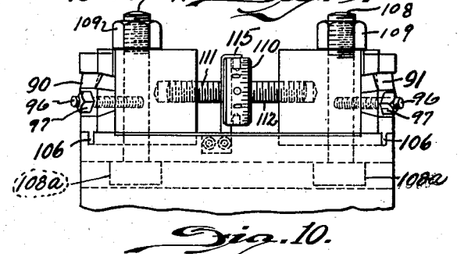
Fig. 10 is a fragmentary view looking in the direction of the arrow 10 of Fig. 9.
Figure 11:
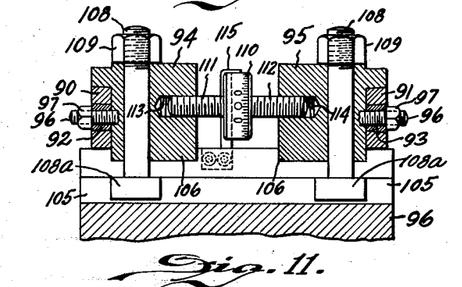
Fig. 11 is a fragmentary sectional view on the line 11—11 of Fig. 9.

The cam 120 is rotated by turning the shaft 121 which is mounted in bearings 150 and 151 carried by the frame 40. At its left hand end the shaft 121 supports a worm gear 152 driven by a worm 153 provided by a shaft 154 journalled in bearings 155 and 156 carried by the frame 40 as shown in Fig. 5. The shaft 154 is tubular and its central bore receives a rod 157 carrying a handle 158 at its outer end and a pin 159 at its inner end. The pin 159 extends through longitudinally elongated slots 160 diametrically opposed in the side wall of the shaft 154. The ends of the pin 159 are connected with a clutch member 161 cooperating with a companion clutch member 162 provided by a bevel gear 163 which is adapted to rotate loosely upon the shaft 154. Gear 163 meshes with a bevel gear 164 attached to a shaft 165 supported by bearings 166 and 167 carried by a frame cover member 168. Shaft 165 carries a pulley 169 connected by a belt 170 with the pulley surface 171 provided by the member 44. When the rod 157 is moved to the right as viewed in Fig. 5 in order to connect the clutch elements 161 and 162, the gear 163 will be connected with the shaft 154 so that when the spindle 43 rotates, motion will be transmitted to the cam 120 through the following driving connections: pulley 171, belt 170, pulley 169, shaft 165, gears 164 and 163, clutch members 162 and 161, pin 159, shaft 154, worm 153, worm gear 152, and shaft 121. The cam 120 is rotated counterclockwise as viewed in Fig. 8 in order to cause the frame 96 to swing counterclockwise to cause the tools 90 and 91 to machine the ends of the work piece A. The cam is so shaped that during about four-fifths of its rotation the cutting tools will be fed toward the work and during about one-fifth of the rotation of the cam 120 the tools are caused to be retracted by the spring 140.

Figures 12, 13, 14, 15, 16, 17:
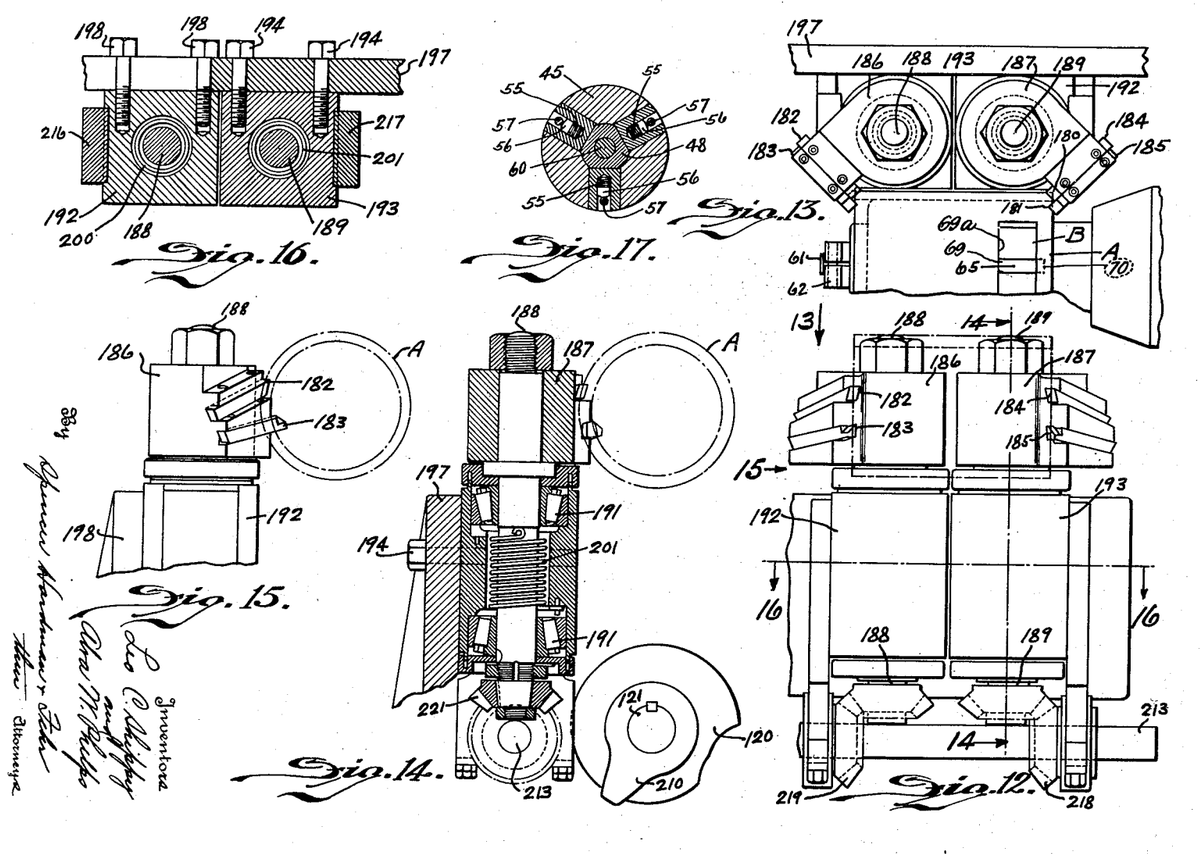
Fig. 12 is a fragmentary side elevation looking in the direction of the arrow 12 of Fig. 8.
Fig. 13 is a fragmentary plan view looking in the direction of the arrow 13 of Fig. 12.
Fig. 14 is a sectional view on the line 14—14 of Fig. 12.
Fig. 15 is a fragmentary side elevation looking in the direction of the arrow 15 of Fig. 12.
Fig. 16 is a sectional view on the line 16—16 of Fig. 12.
Fig. 17 is a sectional view on the line 17—17 of Fig. 4.

After the machining operations performed by the tools 90 and 91 have been performed, but before these tools are retracted, other cutting tools are caused to operate respectively upon the annular outside end edges 180 and annular inside end edges 181 of the work piece A. Referring to Fig. 13, the tools which operate upon the outside end edges 180 are designated by numerals 182 and 184 and the tools which operate upon the inside end edges 181 are designated by numerals 183 and 185. The tools 182 and 183 are adjustably secured to a tool support 186 and the tools 184 and 185 with similar tool supports 187. The supports 186 and 187 are fastened to shafts 188 and 189 respectively journalled in suitable taper roller bearings 190 and 191 carried by bearing blocks 192 and 193 respectively. As shown in Figs. 2 and 3, the block 192 is non-adjustably attached by studs 194 and screws 195 to a wall 196 of the frame 40, but the block 193 may be adjustably secured to the wall 196 by providing therein a slot 197 which receives the screws 198 which are attached to the block 193 used to attach the block 193 to the wall 196. In this way the spacing between the tool holders 186 and 187 may be varied to accommodate work pieces A of different length.

Normally the tools 182, 183 and 184, 185 are held out of engagement with the work piece A by causing the tool supports 186 and 187 to move clockwise and counterclockwise respectively as viewed in Fig. 13. These movements are accomplished by torsion springs 200 and 201 respectively surrounding shafts 188 and 189 respectively and having one end anchored to a shaft and the other end anchored to a shaft supporting block. These springs are so biased as to urge the shafts 188 and 189 clockwise and counterclockwise respectively as viewed in Figs. 13 and 16.

The tool carriers 186 and 187 are caused to advance toward the work by a cam 210 affixed to the shaft 121 and adapted to cooperate with a roller 211 fixed on an arm 212 attached to a shaft 213 journalled in bearings 214 and 215 carried respectively by bearing brackets 216 and 217 attached in any suitable manner to the blocks 192 and 193. The shaft 213 drives bevel gears 218 and 219 which mesh respectively with gears 220 and 221 connected respectively with the lower ends of the shafts 188 and 189. When the cam 210 rotates counterclockwise as viewed in Fig. 8, the shaft 213 will be moved clockwise in order that the shaft 189 will be rotated clockwise and the shaft 188 counterclockwise as viewed in Fig. 13. The cams 120 and 210 are so related that the tools which operate upon the end edges of the work as shown in Fig. 13 will commence to operate immediately following the machining operations produced by the tools 90 and 91 which face off the end surfaces of the work at right angles to its axis. After the cam 210 has rotated so as to clear the roller 211, the springs 200 and 201 will be released to retract the tool carriers 186 and 187 and to turn the arm 212 counterclockwise into normal position. Following these machining operations the lathe is automatically caused to stop by disconnecting the lathe driving motor from its current source and by applying a brake to a rotating part of the lathe, and at the same time the clamping jaws 51 of the work chuck are retracted so that by the time the lathe spindle has come to rest the work will be loosely supported thereupon and may be readily removed. This automatic stopping mechanism is associated with a control device operated by a single operating lever, the movement of which causes the brake to be released, the clamping jaws of the chuck to advance to clamp the work, and the lathe driving motor to be connected with a source of current.

Figure 19:
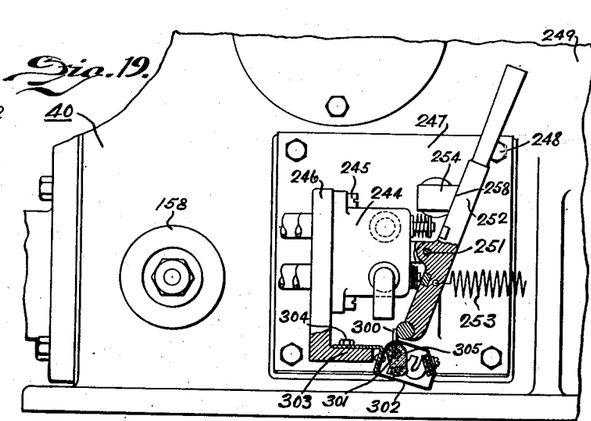
Fig. 19 is a fragmentary side elevation partly in section looking in the direction of the arrow 19 of Fig. 7.
Figure 20:
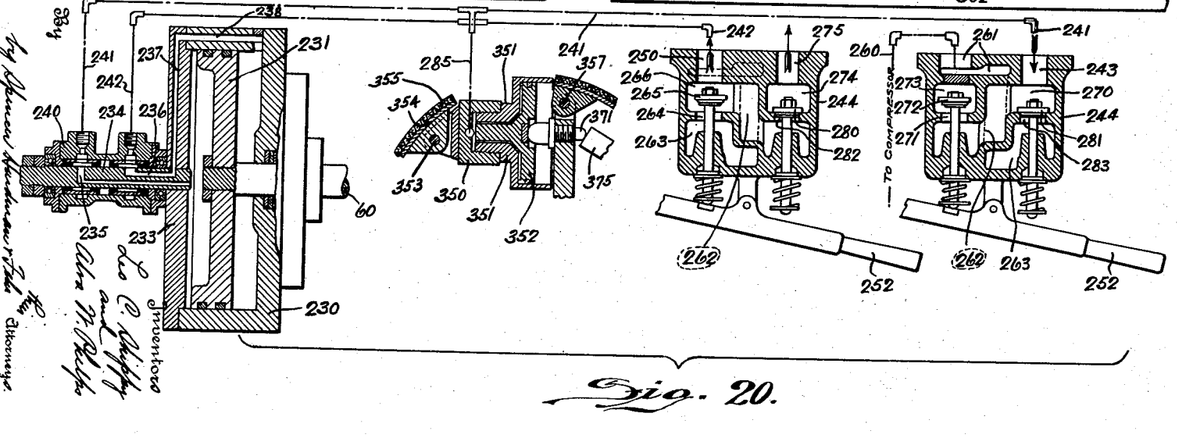
Fig. 20 is a diagram of connections between the fluid pressure cylinders of the machine and the control valve, the parts mentioned being shown in longitudinal section.

The movements of the chuck controlling rod 60 are controlled by fluid pressure means comprising a cylinder 230 which receives a piston 231 attached to the rod 60. The cylinder 230 is attached by screws 232 to the member 44. The cylinder 230 has a cover 233 which centrally supports a shaft 234 providing passages 235 and 236, the former leading into the left end of the cylinder 230 and the latter connected by a passage 237 in the cover 233 and a passage 238 in a side wall of the cylinder 230 with the right end of the cylinder. A fixture 240 swivelly connected with the shaft 234 provides for connecting pipes 241 and 242 respectively with the passages 235 and 236. Pipe 241 leads to a passage 243 in a valve housing 244 which is attached by screws 245 to an annular bracket 246 extending from a cover 247 attached by screws 248 to a wall 249 of frame 40. The pipe 242 is connected with a passage 250 in the valve housing 244. The housing 244 provides at 251 a pivotal support for an operating lever 252 which when located as shown in Figs. 19 and 20 will be maintained in that position against the action of a tension spring 253 by a latch bar 254 which is horizontally slidable through a support 255 provided by the cover 247. The bar 254 is yieldingly urged outwardly by a spring 256 into the position shown in which the bar 254 engages the surface 258 of the lever 252 to hold the same in the position shown.

When the lever 252 is in the positions shown in Figs. 19 and 20, air from a source of fluid pressure (not shown) will be permitted to flow from pipe 260 through passages 261 and 262 into the chamber 263 of the valve housing 240, through port 264, past open valve 265, chamber 266, passage 250, pipe 242, passages 236, 237 and 238 leading into the right hand end of the cylinder 230 to cause the piston 231 to move toward the left from the position shown in Fig. 4 to that shown in Fig. 20 in order to cause the chuck jaws 51 to move outwardly and grip the work piece A placed thereon as shown in Figs. 13 and 24. During the movement of the piston 231 toward the left in the cylinder 230, the left hand end of the cylinder is vented through the following connections: passage 235, pipe 241, passage 243 in valve housing 244, chamber 270, port 271, past open valve 272, chamber 273, connected with chamber 274, and exhaust passage 275.

Figure 21:
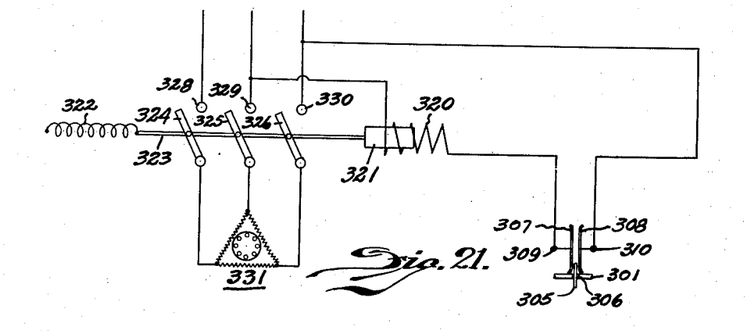
Fig. 21 is a wiring diagram of the electrical connections of the machine.

The movement of the lever 252 into the position shown in Fig. 19 causes its lower end to engage a lever 300 attached to a switch operating shaft 301 rotatably supported by a switch case 302 attached by a bracket 303 to the bracket 246 by a screw 304. The shaft 301 carries a nonconducting plate 305 (see Figs. 20, 22 and 23) carrying a contact button 306 located so as to be moved between two resilient contact members 307 and 308 which are insulatingly supported by the switch case and are connected with terminals 309 and 310 respectively. The contact carrier 305 is urged into circuit open position shown in Fig. 22 by a spring member comprising coils 311 and 312 joined by a loop 313 received by a notch 314 in the carrier 305. The ends 315 and 316 of the coils 311 and 312 respectively are located so as to bear against a portion of the switch case 302. The spring loop 313 is so biased as to urge the contact 306 away from the contacts 307 and 308. When the lever 300 has been moved into the position shown in Fig. 19, a circuit will be established between contacts 307 and 308 by reason of the engagement of contact 306 with them. Referring to Fig. 21, when this occurs, an electric circuit will be established through a relay magnet 320 to cause the same to be energized and attract an armature 321 against the action of a spring 322 connected with the armature by a rod 323 connected also with switch blades 324, 325 and 326 thereby causing these blades respectively to contact with contacts 328, 329 and 330 thereby establishing a circuit with an electric motor 331. It is therefore apparent that movement of the control lever 252 into the position shown in Figs. 2, 19 and 20, the work will be automatically gripped by the chuck and the lathe driving motor will be connected with a current source so that the lathe will operate in the manner described until the machining of one piece of work has been completed.

Figure 18:
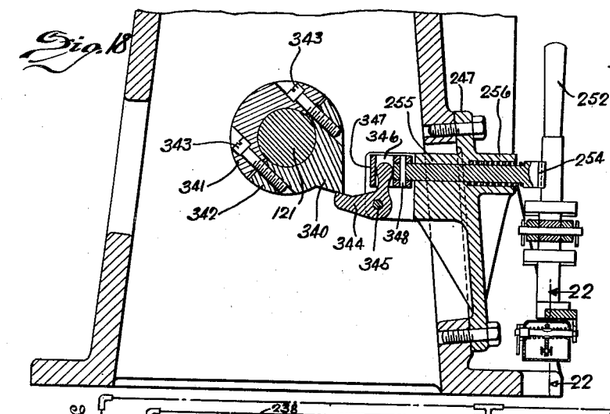
Fig. 18 is a fragmentary sectional view on the line 18—18 of Fig. 7.

At the end of one cycle of operations of the machine, during which the shaft 121 makes one revolution in a clockwise direction as viewed in Fig. 18, the control lever 252 is automatically unlatched so that the spring 253 will return it to the position shown in Fig. 1 thereby causing the machine to stop and the clamping jaws of the chuck to be retracted from the work piece. The automatic release of the lever 252 is effected by a cam 340 fastened by a clamping hub 341, 342 and screws 343 to the shaft 121. The cam 340 engages a bell crank lever 344 pivoted at 345 upon the cover 247 and having an arm received by a hole 346 in a block 347 attached by pin 348 to the latch 254. As the cam 340 moves clockwise the lever 344 will be caused to be moved counterclockwise in order to move the latch 254 away from the lever 252 so that the spring 253 will return the lever to the position shown in Fig. 1. When this occurs, the relay switch contact 306 will be moved by springs 311 and 312 away from contacts 307 and 308, and the spring 322 will open the main switch of the motor 331, and the machine will finally stop.

In this position of lever 252 the control valves 265 and 272 are closed and valves 280 and 281 are opened. The compressed air pipe 260 will then be connected by passages 261, 262, chamber 263, port 283, chamber 270, passage 243 with pipe 241 which leads to passage 235 communicating with the left end of the cylinder 230. The right end of the cylinder 230 is connected with atmosphere by pipe 242, passage 250, chamber 266, port 282, (opened by 280), chamber 274 and exhaust passage 275. The piston 231 will then move toward the right in order to move the chuck control rod 60 and cam 48 toward the right to allow the springs 55 to retract the chuck jaws 51.

Figure 6:
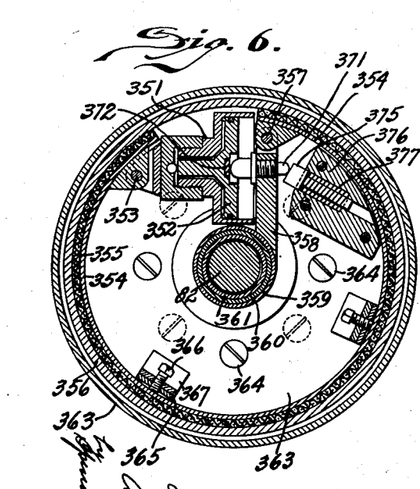
Fig. 6 is a sectional view on the line 6—6 of Fig. 5.

The pipe 241 is also connected by a branch pipe 285 with a coupling member 350 attached to an air brake cylinder 351 cooperating with a piston 352. The coupling 350 is pivotally connected at 353 with a brake band carrier 354 carrying a lining of brake material 355 adapted to cooperate with a brake drum 356 integral with the pulley 81. The brake band carrier 354 is pivotally connected at 357 with an arm 358 having a hub 359 provided with a bearing liner 360 journalled on a tubular extension 361 of a support 362 which is attached to a housing member 363 secured by screws 364 to the frame 40. Between the pivot points 353 and 357 the band carrier 354 is held laterally in proper cooperative relation with the drum 356 by channel plates 365 welded to brackets 367 attached to the housing 363; and the brake band carrier 354 is adjusted radially by screws 366 threaded in brackets 367 and plates 365. The arm 358 threadedly receives a stud 371. The left hand end of stud 371 engages a wear piece 372 attached to the piston 352. The right hand end of the stud 371 engages a plunger 375 slidably supported by a block 376 attached to the housing 363 and urged by a spring 377 toward the stud 371. It is therefore apparent that when compressed air is admitted to the cylinder 351, the piston 352 will be forced toward the right, and the cylinder 351 toward the left in order to cause the brake band carrier 354 to expand and move the brake band 355 against the drum 356. This operation will result in bringing the lathe quickly to rest. Obviously, when the control lever 252 is moved into position for starting the machine, the brake will be released in the following manner: the cylinder 351 will be vented through the pipes 285, 241, passage 243, chamber 270, chamber 274 and passage 275 (see Fig. 20), thereby permitting the return of the piston 352 to normal position shown in Fig. 6 which is effected by the cooperation of the spring pressed plunger 375 with the stud 371 in order to contract the brake band carrier 354 and release it from the drum 356.

The automatic lathe is operated at a speed such that the operator can unload and reload the chuck of one machine and start it operating while another machine is machining the ends of a frame A.

While the form of embodiment of the present invention as herein disclosed, constitutes a preferred form, it is to be understood that other forms might be adopted, all coming within the scope of the claims which follow.

What is claimed is as follows:

1. A lathe for machining a tubular body comprising, in combination, a rotating spindle, a chuck carried by the spindle for supporting the body with an end free, means for machining an end thereof to provide an end surface normal to the axis of rotation of the chuck, and means for automatically stopping the machine and for causing the chuck to release the body after a machining operation.

2. A lathe for machining a tubular body comprising, in combination, a rotating spindle, a chuck carried by the spindle for supporting the body with an end free, means for machining an end thereof to provide an end surface normal to the axis of rotation of the chuck, an electric motor for operating the spindle, and means for automatically stopping the motor after a machining operation.

3. A lathe for machining a tubular body comprising, in combination, a rotating spindle, a chuck carried by the spindle for supporting the body with an end free, means for machining an end thereof to provide an end surface normal to the axis of rotation of the chuck, an electric motor for operating the spindle, and means for automatically stopping the motor and for causing the chuck to release the body after a machining operation.

4. A lathe for machining a tubular body comprising, in combination, a rotating spindle, a chuck carried by the spindle for supporting the body with an end free, means for machining an end thereof to provide an end surface normal to the axis of rotation of the chuck, an electric motor for operating the spindle, a switch for connecting the motor with a current source, a brake for stopping the spindle, and means for automatically causing the motor switch to open and the brake to operate after a machining operation.

5. A lathe for machining a tubular body comprising, in combination, a rotating spindle, a chuck carried by the spindle for supporting the body with an end free, means for machining an end thereof to provide an end surface normal to the axis of rotation of the chuck, an electric motor for operating the spindle, a switch for connecting the motor with a current source, a brake for stopping the spindle, and means for automatically causing the motor switch to open and the brake to operate and for causing the chuck to release the body after a machining operation.

6. A lathe for machining a tubular body comprising, in combination, a rotating spindle, a chuck carried by the spindle for supporting the body with an end free, means for machining an end thereof to provide an end surface normal to the axis of rotation of the chuck, an electric motor for operating the spindle, a switch for connecting the motor with a current source, a brake for stopping the spindle, fluid pressure means for operating the brake, and a controller manually operated to release the brake and close the motor switch and automatically operated after a machining operation to cause the motor switch to open and the brake to operate.

7. A lathe for machining a tubular body comprising, in combination, a rotating spindle, a chuck carried by the spindle for supporting the body with an end free, means for machining an end thereof to provide an end surface normal to the axis of rotation of the chuck, an electric motor for operating the spindle, a switch for connecting the motor with a current source, means for operating the chuck, and a controller manually operated to close said motor switch and to cause the chuck operating means to actuate the chuck into work gripping position and automatically operated after a machining operation to cause the switch to open and the chuck operating means to actuate the chuck into nongripping position.

8. A lathe for machining a tubular body comprising, in combination, a rotating spindle, a chuck carried by the spindle for supporting the body with an end free, means for machining an end thereof to provide an end surface normal to the axis of rotation of the chuck, an electric motor for operating the spindle, a switch for connecting the motor with a current source, fluid pressure means for operating the chuck, and a controller manually operated to close said motor switch and to cause said fluid pressure means to actuate the chuck into work gripping position, and automatically operated after a machining operation to cause said switch to open and said fluid pressure means to actuate the chuck into a nongripping position.

9. A lathe for machining a tubular body comprising, in combination, a rotating spindle, a chuck carried by the spindle for supporting the body with an end free, means for machining an end thereof to provide an end surface normal to the axis of rotation of the chuck, an electric motor for operating the spindle, a switch for connecting the motor with a current source, fluid pressure means for operating the brake, another fluid pressure means for operating the chuck, and a controller manually operated to close said motor switch and to cause the first fluid pressure means to actuate the brake into releasing position and to cause the second fluid pressure means to actuate the chuck into work gripping position, and automatically operated after a machining operation to cause the switch to open the brake to be applied and the chuck to be actuated into nongripping position.

10. A lathe for chamfering the end faces of a tubular workpiece comprising, in combination, a rotating spindle, a chuck on the spindle for supporting the workpiece; means for simultaneously chamfering the external and internal edges of the end faces of the workpiece; means for withdrawing the chamfering means from the workpiece after a chamfering operation; means for automatically stopping the machine and simultaneously for causing the chuck to release the workpiece after withdrawal of the chamfering means.

11. A lathe for chamfering the end faces of a tubular workpiece comprising, in combination, a rotating spindle, a chuck on the spindle for supporting the workpiece; tools adapted simultaneously to chamfer the external and internal edges of the end faces of the workpiece; tool carriers adjacent each end face of the workpiece and movable in such manner that the tools approach the end faces of the workpiece substantially parallel to the axis of the latter; devices for moving the tools toward the work and for withdrawing the tools from the work after a chamfering operation; means for automatically stopping the machine and simultaneously for causing the chuck to release the workpiece after withdrawal of the chamfering means.

12. A lathe for chamfering the end faces of a tubular workpiece comprising, in combination, a rotating spindle, a chuck on the spindle for supporting the workpiece; tools adapted simultaneously to chamfer the external and internal edges of the end faces of the workpiece; tool carriers pivotally mounted adjacent each end face of the workpiece so that the tools approach the end faces of the workpiece substantially parallel to the axis of the latter; power operated means for positively moving the tool carriers toward the workpiece to cause the tools to engage the same, the other means for moving tool carriers away from the work after a chamfering operation; and means for automatically stopping the machine and simultaneously for causing the chuck to release the workpiece after withdrawal of the tools.

13. A lathe for chamfering the end faces of a tubular workpiece comprising, in combination, a rotating spindle, a chuck on the spindle for supporting the workpiece; tools adapted simultaneously to chamfer the external and internal edges of the end faces of the workpiece; tool carriers pivotally mounted adjacent each end face of the workpiece so that the tools approach the end faces of the workpiece substantially parallel to the axis of the latter; power operated means for rocking the tool carrier in a certain direction in order to engage the tools with the internal and external edges of the end faces of the workpiece; yielding means released after the chamfering operation for rocking the tool carriers in the reverse direction; and means for automatically stopping the machine and simultaneously for causing the chuck to release the workpiece after withdrawal of the tools.

14. A lathe for chambering the end faces of a tubular workpiece comprising, in combination, a rotating spindle, a chuck on the spindle for supporting the work piece; tools adapted simultaneously to chamfer the external and internal edges of the end faces of the workpiece; tool carriers pivotally mounted adjacent each end face of the workpiece so that the tools approach the end faces of the workpiece substantially parallel to the axis of the latter; a gear attached to each tool carrier; driving gears cooperating respectively with the tool carrier gears, adapted to cause rocking of the tool carriers so that the tools engage the internal and external edges of the end faces of the workpiece; cam means for operating the driving gears for maintaining the tools in cutting engagement until completion of the chamfering operation; springs released, after the cam means becomes ineffective, for rocking the tool carriers away from the workpiece; and means for automatically stopping the machine and simultaneously for causing the chuck to release the workpiece after withdrawal of the tools.

15. A lathe for chamfering the end faces of a tubular workpiece comprising, in combination, a rotating spindle, a chuck on the spindle for supporting the workpiece; tools adapted simultaneously to chamfer the external and internal edges of the end faces of the workpiece; tool carriers pivotally mounted adjacent each end face of the workpiece so that the tools approach the end faces of the body substantially parallel to the axis of the latter; a gear attached to each tool carrier; driving gears, each cooperating with one of the tool carrier gears, adapted to cause rocking of the tool carriers so that the tools engage the internal and external edges of the end faces of the workpiece; cam means for operating the driving gears; springs normally tending to rock the tool carriers away from the workpiece, said springs being released after the automatically operated gears cease to maintain the tools in cutting engagement; and means for automatically stopping the machine and simultaneously for causing the chuck to release the workpiece after withdrawal of the tools.

16. A lathe for chamfering the end faces of a tubular workpiece comprising, in combination, a rotating spindle, a chuck on the spindle for gripping the workpiece; manually operable means for controlling the chuck; means yieldingly urging the control means into a position to cause the chuck to release the workpiece; a latch for holding the control means in chuck-gripping position; a tool carrier carrying a cutting tool for operating upon the workpiece; a cam shaft; a cam on said shaft for actuating the tool carrier; and another cam on said shaft for releasing the latch.

17. A lathe for chamfering the end face of a tubular workpiece comprising, in combination, a rotary spindle; a chuck on the spindle for supporting the workpiece coaxial with the spindle; a tool adapted to operate upon the workpiece; a tool carrier; a block movably supporting the tool carrier; means for supporting the block and providing for adjustment thereof parallel to the spindle axis; a shaft parallel to the spindle axis; and driving connections between the shaft and the tool carrier, said connections being maintained regardless of adjustment of the tool carrier.

18. A lathe for chamfering the end face of a tubular workpiece comprising, in combination, a rotary spindle; a chuck on the spindle for supporting the workpiece coaxial with the spindle; a tool adapted to operate upon the workpiece; a tool carrier; a block rotatably supporting the tool carrier; means for supporting the block and providing for adjustment thereof parallel to the spindle axis; a gear on the tool carrier adapted to operate the same; a shaft parallel to the spindle axis; a second gear driven by the shaft and slidable along the shaft and meshing with the tool carrier gear; and means for operating the shaft.

19. A lathe for chamfering the end face of a tubular workpiece comprising, in combination, a rotary spindle; a chuck on the spindle for supporting the workpiece coaxial with the spindle; a tool adapted to operate upon the workpiece; a tool carrier shaft at right angles to the spindle axis; a block rotatably supporting the tool carrier; means for supporting the block and providing for adjustment thereof parallel to the axis of the spindle; a bevel gear on the tool carrier; a shaft parallel to the spindle axis; a second bevel gear meshing with the first bevel gear and drivingly connected with the second shaft and slidable thereon; means on the block for maintaining the gears in mesh; and means for operating the shaft.

20. A machine for operating upon a tubular workpiece having an aperture intermediate its ends, said machine comprising, in combination, a tool for operating upon the workpiece, a spindle; a chuck on the spindle for receiving the workpiece; a member carried by said chuck and having a portion for projecting into the aperture of the workpiece when in proper position upon the chuck thereby maintaining the body in a desired position relative to the tool; means for causing the chuck to grip the workpiece in such position; and means for operating the tool.

21. A machine for operating upon a tubular workpiece having an aperture intermediate its ends, said machine comprising, in combination, a tool for operating upon the workpiece; a spindle; a chuck on the spindle receiving a work piece; a movable member carried by said chuck and having a part engaged by the workpiece when moved relative to the chuck for causing the member to project into the aperture of the workpiece thereby locating the workpiece in the desired position; means for causing the chuck to grip the workpiece; and means for operating the tool.

22. A machine for operating upon a tubular workpiece having an aperture intermediate its ends; said machine comprising, in combination, a tool for operating upon the workpiece; a spindle; a chuck on the spindle over which the workpiece is passed; a member pivoted to the chuck and having a first part engageable with a side wall of the aperture and having a second part engaged by an end portion of the workpiece when moved into nearly final position, said second part being so moved by the workpiece, as the latter is moved into final position, that the first part moves into the aperture to engage a side wall thereof to stop movement of the workpiece; means for causing the chuck to grip the workpiece; and means for operating the tool.

23. A machine for operating upon a tubular workpiece having an aperture intermediate its ends, said machine comprising in combination, a tool for operating upon the workpiece; a spindle; a chuck on the spindle over which the workpiece is passed; a lever pivoted upon the chuck upon an axis transverse to the axis of the chuck and intermediate its arms, the arms being so constructed and arranged that, when the arm nearest the approaching workpiece lies within the boundary of the workpiece, the arm furtherest from the approaching workpiece lies in the path of movement of the same, said second arm being moved by the workpiece into a position such as to cause the first arm to enter the aperture when the workpiece has been moved into nearly final position, whereby the first arm stops the workpiece in the required position; a spring normally maintaining the lever in the first mentioned position; means for causing the chuck to grip the workpiece; and means for operating the tool.

In testimony whereof we hereto affix our signatures.

LEO C. SHIPPY.
ALVA W. PHELPS.